United States Patent
Cassar et al.

(10) Patent No.: US 10,427,691 B2
(45) Date of Patent: Oct. 1, 2019

(54) METHOD FOR DETECTING THE DIRECTION OF TRAVEL OF A MOTOR VEHICLE

(71) Applicant: JTEKT EUROPE, Irigny (FR)

(72) Inventors: Stephane Cassar, Caluire (FR); Romain Moretti, Soucieu en Jarrest (FR); Luc Leydier, Oullins (FR)

(73) Assignee: JTEKT EUROPE, Irigny (FR)

( * ) Notice: Subject to any disclaimer, the term of this patent is extended or adjusted under 35 U.S.C. 154(b) by 0 days.

(21) Appl. No.: 14/413,002

(22) PCT Filed: Jul. 3, 2013

(86) PCT No.: PCT/FR2013/051571
§ 371 (c)(1),
(2) Date: Jan. 5, 2015

(87) PCT Pub. No.: WO2014/006330
PCT Pub. Date: Jan. 9, 2014

(65) Prior Publication Data
US 2015/0158496 A1    Jun. 11, 2015

(30) Foreign Application Priority Data
Jul. 6, 2012  (FR) ...................................... 12 56522

(51) Int. Cl.
*B60W 40/10* (2012.01)
*B60W 40/105* (2012.01)
(Continued)

(52) U.S. Cl.
CPC .......... *B60W 40/10* (2013.01); *B60W 40/105* (2013.01); *B60W 40/109* (2013.01);
(Continued)

(58) Field of Classification Search
CPC .. B60W 40/10; B60W 40/105; B60W 40/109; B60W 40/114
(Continued)

(56) References Cited

U.S. PATENT DOCUMENTS 6,141,605 A * 10/2000 Joyce ...................... B60T 8/172
                                                                180/421
6,272,403 B2 *  8/2001 Sugitani .................. G01P 15/00
                                                                701/1
(Continued)

FOREIGN PATENT DOCUMENTS

DE         4223385 A1   1/1994
DE    102007030431 A1   1/2009
(Continued)

OTHER PUBLICATIONS

International Search Report dated Oct. 28, 2013 re: Application No. PCT/FR2013/051571.

*Primary Examiner* — Gregory J Toatley, Jr.
*Assistant Examiner* — Douglas Kay
(74) *Attorney, Agent, or Firm* — Oliff PLC

(57) ABSTRACT

The invention concerns a method for determining the direction of longitudinal travel of a vehicle comprising a step (a) of collecting a first signal (Signal1), representative of a first driving parameter, such as the steering-wheel torque, and of which the sign of the value and/or the sign of the variations is not dependent on the direction of longitudinal travel of the vehicle, a step (b) of collecting a second signal (Signal2), representative of a second driving parameter separate from the first driving parameter, such as the yaw rate, and of which the sign of the value and/or the sign of the variations changes on the basis of the direction of longitudinal travel of the vehicle, then a step (c) of comparing signs during which the sign of the value, or of the variation, of the first signal (Signal1) is compared with the sign of the value, or of the (Continued)

variation, of the second signal (Signal2) in order to deduce therefrom the direction of longitudinal travel of the vehicle, depending on whether said signs are identical or, on the contrary, different.

12 Claims, 3 Drawing Sheets

(51) Int. Cl.
    *B60W 40/109*     (2012.01)
    *B60W 40/114*     (2012.01)

(52) U.S. Cl.
    CPC ..... *B60W 40/114* (2013.01); *B60W 2510/202* (2013.01); *B60W 2520/06* (2013.01); *B60W 2520/14* (2013.01); *B60W 2540/18* (2013.01)

(58) Field of Classification Search
    USPC .......................................................... 702/150
    See application file for complete search history.

(56) References Cited

U.S. PATENT DOCUMENTS

| | | | | |
|---|---|---|---|---|
| 7,418,327 B2 * | 8/2008 | Pelchen | ............. | B60W 30/045 180/234 |
| 7,447,585 B2 * | 11/2008 | Tandy, Jr. | ............. | B60T 8/1708 180/14.2 |
| 7,512,472 B2 * | 3/2009 | Tandy, Jr. | ............. | B60T 8/1708 280/418.1 |
| 7,522,985 B2 * | 4/2009 | Fiedler | ................ | B60R 21/0132 180/170 |
| 7,731,302 B2 * | 6/2010 | Tandy, Jr. | ............. | B60T 8/1708 303/124 |
| 7,734,405 B2 * | 6/2010 | Tandy, Jr. | ................. | B60T 7/20 180/204 |
| 7,798,263 B2 * | 9/2010 | Tandy, Jr. | ............. | B60T 8/1708 180/14.6 |
| 8,188,385 B2 * | 5/2012 | Wolfgang | ............ | B60G 17/019 177/136 |
| 8,731,776 B2 * | 5/2014 | Cassar | ................. | B62D 15/021 180/443 |
| 8,756,822 B2 * | 6/2014 | Rabiner | ................. | G01B 11/27 33/286 |
| 8,874,320 B2 * | 10/2014 | Barthomeuf | .......... | B60W 40/12 701/42 |
| 9,933,451 B2 * | 4/2018 | Dupont De Dinechin | ................. | G01P 13/025 |
| 2007/0179735 A1 * | 8/2007 | Fiedler | ................ | B60R 21/0132 702/150 |
| 2007/0256878 A1 * | 11/2007 | Tandy, Jr. | ................. | B60T 7/20 180/282 |
| 2007/0257549 A1 * | 11/2007 | Tandy, Jr. | ............. | B60T 8/1708 303/7 |
| 2007/0260385 A1 * | 11/2007 | Tandy, Jr. | ............. | B60T 8/1708 701/70 |
| 2007/0260386 A1 * | 11/2007 | Tandy, Jr. | ............. | B60T 8/1708 701/70 |
| 2007/0260387 A1 * | 11/2007 | Tandy, Jr. | ............. | B60T 8/1708 701/70 |
| 2010/0108406 A1 * | 5/2010 | Wuerthner | ........... | B60G 17/019 177/136 |
| 2011/0276242 A1 * | 11/2011 | O'Dea | .................. | B60W 40/10 701/70 |
| 2011/0295474 A1 * | 12/2011 | Ma | ........................... | F02D 29/02 701/58 |
| 2011/0320090 A1 * | 12/2011 | Barthomeuf | .......... | B60W 40/12 701/42 |
| 2012/0053853 A1 * | 3/2012 | Tan | ..................... | B60W 40/105 702/35 |
| 2013/0263459 A1 * | 10/2013 | Rabiner | ................. | G01B 11/27 33/228 |
| 2014/0012469 A1 * | 1/2014 | Kunihiro | ............. | B60W 40/072 701/41 |
| 2015/0052994 A1 * | 2/2015 | Dupont De Dinechin | ................. | G01P 13/025 73/180 |

FOREIGN PATENT DOCUMENTS

| | | | | |
|---|---|---|---|---|
| DE | 102011080033 | * | 2/2012 | ............. G01P 13/04 |
| DE | 102011080033 A1 | | 2/2012 | |
| FR | 2953181 A1 | | 6/2011 | |

\* cited by examiner

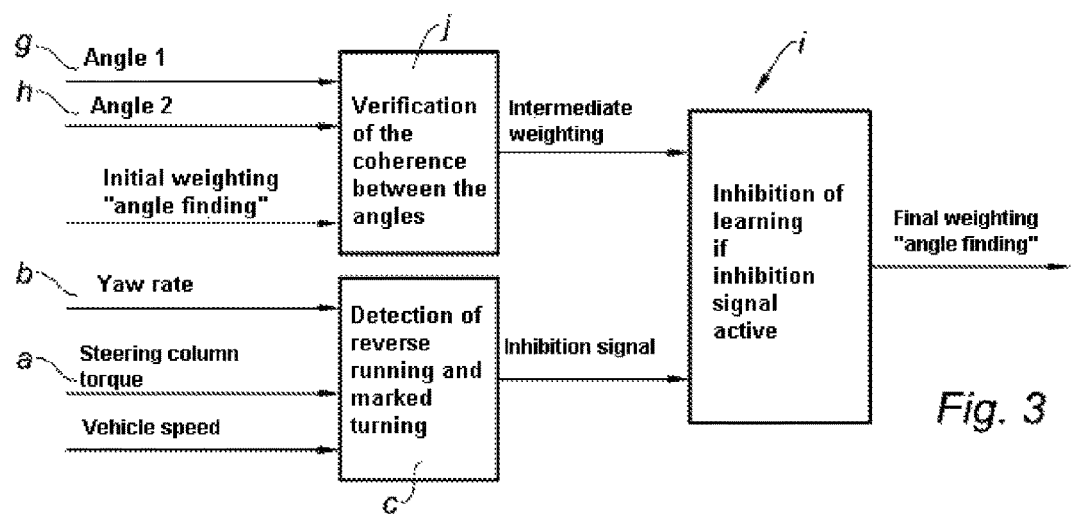

METHOD FOR DETECTING THE DIRECTION OF TRAVEL OF A MOTOR VEHICLE

TECHNICAL FIELD

The present invention relates to the general field of devices and methods for assisting the driving of a motor vehicle, intended to facilitate and make safe the maneuver of such a vehicle.

It more particularly relates to a method for detecting the direction of travel of a motor vehicle, as well using this information as to the direction of travel for managing an assisted steering system, in particular of power assisted steering system.

BACKGROUND

It is known to detect the longitudinal direction of travel (forward or reverse) of a vehicle by means of a sensor placed at the gear box, such an information being possibly useful for achieving the diverse on-board functions of driving assistance of said vehicle, such as, for example, parking assistance.

If such a detection mode is generally satisfactory, it may nevertheless have certain limitations.

By way of example, the detection may in fact be inoperative when no gear is engaged, or when the driver declutches.

Thus, in certain circumstances, and for example if the driver decides to make his/her vehicle reverse in neutral on a slight slope, said driver may be deprived of certain assistance functions, at the cost of his/her driving comfort, or even his/her safety.

BRIEF SUMMARY

The invention therefore aims at bringing a remedy to the aforementioned drawbacks and proposing a new method for detecting the longitudinal direction of travel of a vehicle which is available and reliable whatever the operating conditions of the vehicle, and particularly which can work regardless of a connection of the motor to the drive wheels, while exhibiting a relative simplicity of implementation.

The invention provides a method for determining the longitudinal direction of travel of a vehicle characterized in that it comprises a step (a) of collecting a first signal (Signal1), representing a first driving parameter, wherein the sign of the value of said first signal and/or the sign of the variations of said first signal does not depend on the longitudinal direction of travel of the vehicle, a step (b) of collecting a second signal (Signal2), representing a second driving parameter distinct from the first driving parameter, and wherein the sign of the value of said second signal, and/or the sign of the variations of said second signal changes depending on the longitudinal direction of travel of the vehicle, then a signs comparison step (c) during which the sign of the value, respectively the sign of the variation, of the first signal (Signal1) is compared with the sign of the value, respectively the sign of the variation, of the second signal (Signal2) in order to deduce therefrom the longitudinal direction of travel of the vehicle, depending on whether said signs are identical or on the contrary different.

Advantageously, since the method according to the invention uses, as source of information, signals which are based on constantly determinable driving parameters and which are periodically made available, in all circumstances, on the on-board network, by diverse sensors or on-board systems, the method according to the invention allows determining in permanence the direction of travel of said vehicle, whatever the operating conditions of the vehicle, and in a precise and sturdy manner, by using reliable signals.

In addition, this detection of the direction of travel is achieved by a particularly simple sign analysis operation, which requires few electronics or software programming, and requires no addition, nor even presence, of a dedicated sensor. Hence, the implementation of said method is particularly simple and cheap, and may even possibly make it possible to lighten the on-board load in the vehicle by saving a sensor.

BRIEF DESCRIPTION OF THE DRAWINGS

Other features and advantages of the invention will become apparent in further detail upon reading the following description, as well as by using the accompanying drawings, provided by way of purely illustrating and non limiting examples, among which:

FIG. 3 illustrates, according to a functional block diagram, the use of a method for determining the direction of travel as means for monitoring and controlling a learning method allowing to determine the absolute angular multi-rotation position of a steering wheel in an assisted steering system.

DETAILED DESCRIPTION

The present invention relates to a method for determining the longitudinal direction of travel of a vehicle.

Said method advantageously allows determining, in automatic manner, if the related vehicle, at the relevant instant, progresses forward or in reverse, and making this information ("direction of travel") available to one or several onboard computers liable to use it, for example by means of a controller area network (CAN).

Out of convenience, it will be considered in the following that a forward progression corresponds to a positive linear speed (V>0), considered along the tangent to the trajectory followed by the vehicle, and that a reverse progression corresponds to a negative linear speed (V<0).

Figure 1:
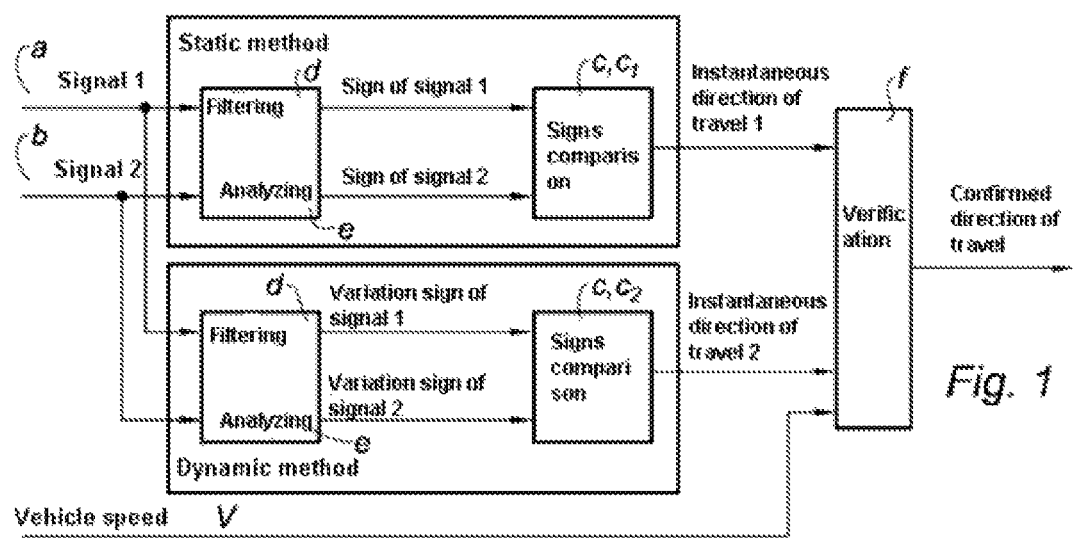
FIG. 1 illustrates, according to a functional block diagram, the proceedings of a method for determining the direction of travel of a vehicle in accordance with the invention.

According to the invention, and as particularly illustrated on FIG. 1, the method comprises a step (a) of collecting a first signal Signal1, representing a first driving parameter, and wherein the sign of the value of said first signal the sign of the value and/or the sign of the variations of said first signal does not depend on the longitudinal direction of travel of the vehicle, a step (b) of collecting a second signal Signal2, representing a second driving parameter distinct from the first driving parameter, and wherein the sign of the value of said second signal, and/or the sign of the variations of said second signal changes according to the longitudinal direction of travel of the vehicle, then a step (c) of comparing signs during which the sign of the value, respectively the sign of the variation, of the first signal Signal1 is compared with the sign of the value, respectively the sign of the variation, of the second signal Signal2 in order to deduce therefrom the longitudinal direction of travel of the vehicle (V>0 or V<0), depending on whether said signs are identical or on the contrary different.

Out of convenience for the description, the expression "signal" can, if need be, indifferently designate in the following, unless otherwise specified, the value quantifying the magnitude of said signal (and hence the magnitude of the associated parameter) at a given instant, as well as a difference or a gradient representing a variation of said signal, and in particular a derivative of first order (or even of higher order) of said signal with respect to time.

By "driving parameter", it is here considered any parameter suitable for implementing the function of comparison, and in particular any parameter which may be measured directly or computed indirectly and which represents a physical magnitude, in particular kinematic or dynamic, which characterizes an aspect of the movement of the vehicle or a setpoint which is applied to said vehicle for its driving, provided of course that the behavior of the sign of said parameter satisfies the condition of being sensitive (for the second parameter), or insensitive (for the first parameter) to the direction of travel.

Advantageously, the sign of the first signal allows detecting a first driving condition, representing a subset of possible operating conditions, and thus allows setting a first element of a reference system, said reference system being such that the knowledge of the sign of the second parameter in said reference system will then allow deducing, in a deterministic manner, in view of the operating conditions which may exist in said reference system, the direction of travel of the vehicle.

The convention used may depend on the nature of the retained parameters.

Thus, it may for example be raised, as a rule, that the direction of travel of the vehicle corresponds to forward running (V>0) when the sign of the first signal Signal1 is identical to the sign of the second signal Signal2, and, on the contrary, that the direction of travel corresponds to a reverse running (V<0) when the signs of the two signals are different one from the other, that is to say are opposite signs. Of course, the inverse convention may also be considered.

Advantageously, the invention hence allows a reliable detection of the direction of travel, according to a particularly simple law, cheap to program and implement.

Preferably, the first considered driving parameter will be the wheel torque (designated by the expression "steering column torque" on FIG. 3), representing the torque exerted by the driver on the steering wheel.

Said wheel torque may of course be provided by any suitable acquisition means. Thus, it could preferably be provided, and more particularly measured directly, by a torque sensor, for example placed on the steering column or in any other suitable place, and preferably belonging to an assisted steering system, and in particular a power assisted steering. Said wheel torque may also be obtained indirectly, if need be, by an evaluation based on the processing of other available signals by a suitable computer.

Once the sign convention raised for this first signal, in order to be able to differentiate a torque corresponding to a right turn (here chosen by convention as being of negative sign) of a left turn torque (chosen as being of positive sign), with respect to the normal forward driving position of the vehicle, said first signal, here representing such a parameter of wheel torque, advantageously contains an information that enables associating a left/right reference system to the vehicle, in relation to the direction of travel, that is to say said first signal sets a first condition for determining said direction of travel.

Preferably the second considered driving parameter will be the yaw rate $\psi'$ of the vehicle, which may advantageously be provided by a stability control system, of ESP (Electronic Stability Control) type.

Advantageously, this second signal contains a second information setting a second condition for determining the direction of travel which, in combination with the first condition brought by the first signal, enables clearing the indetermination as to the operating conditions in which the vehicle is actually in, by restraining the range of possibilities to one single situation which simultaneously satisfies these two conditions.

Figure 2:
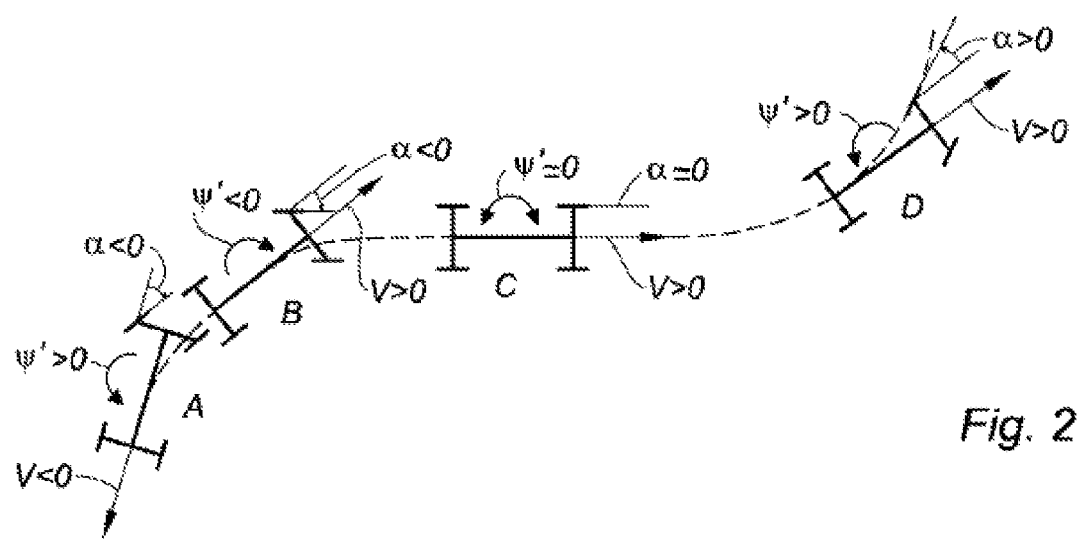
FIG. 2 illustrates, according to a schematic top view, examples of operating conditions of the vehicle and their impact on the sign of certain signals.

This reasoning will be better understood by means of the example illustrated on FIG. 2.

It will be considered as a rule that the wheel torque, linked to the turning angle $\alpha$ of the front guiding wheels, is positive when the driver pulls the steering wheel to the left (when he/she is in normal driving position, looking towards the front of the vehicle), to orient the front axle towards the left, positively in the trigonometric direction, and that said wheel torque is a contrario negative when the steering wheel is pulled to the right.

Similarly, it will be considered that the yaw rate $\psi'$ is positive during a rotation of the vehicle around itself in the trigonometric direction (anticlockwise).

Thus, if the vehicle runs in reverse (V<0) in a bend which is "conventionally" oriented to the right with respect to the vehicle (situation FIG. 2A), this being signaled by a steering wheel turned to the right ($\alpha$<0), then the resulting yaw rate is inevitably positive ($\psi'$>0).

Conversely, the simultaneous detection of a first negative signal, signaling a wheel torque oriented towards the right ($\alpha$<0), and a second positive signal (that is to say of opposite sign), signaling a positive yaw rate ($\psi'$>0) and hence an anticlockwise gyratory movement, inevitably indicates a reverse running (V<0).

If, in this same bend to the right, the vehicle stops then restarts in forward running (V>0), it is understood that the steering wheel remains turned to the right ($\alpha$<0), even if the turning intensity may possibly vary, while the yaw direction is reversed, the travel in fact inducing, in the coordinate system of the ground, a gradual rotation of the vehicle on itself in the clockwise direction (situation FIG. 2B).

The change in direction of travel may hence be detected by the change in the yaw rate sign, which becomes in this instance negative ($\psi'$<0).

More globally, the detected accumulation of a right turn negative torque ($\alpha$<0) and a negative yaw rate ($\psi'$<0), that is to say of the same sign, inevitably signals a forward running (V>0).

When, after the bend, the vehicle pursues its forward travel and in a straight line (situation 2C), the steering wheel is in theory in a centered position ($\alpha$=0) and the yaw rate is in theory substantially zero ($\psi'$=0), with the possible exception of slight variations reflecting tiny trajectory corrections around this neutral situation.

In such a situation, in order to prevent any false interpretation due to a possible indetermination linked to the weakness of the collected signals, which are in theory substantially zero, the method according to the invention may advantageously comprise, as detailed hereinafter, steps of filtering and/or verifying that enable(s) ignoring signals or conclusions deemed unreliable and/or taking suitable protective measures.

When finally the vehicle takes on a forward running left turn (situation FIG. 2D), the steering torque (to the left) becomes strictly positive ($\alpha>0$), just as the yaw rate ($\psi'>0$).

Here again, the detection of a first signal and a second signal of the same sign, in this instance both positive, characterizes a forward running.

It is furthermore noticeable that the use of parameters, here wheel torque and yaw rate, which are already available on the on-board network CAN, as they are provided periodically by various onboard systems (Anti-lock Braking System (ABS), ESP) distinct from assisted steering, allows in particular to do without the use, and more globally to do without the presence of a specific sensor, which would be exclusively dedicated to detecting the direction of travel, thus contributing to simplify and lighten the structure of the vehicle.

According to a first possible implementation ("static method" in FIG. 1), it may be achieved, during a comparison step (c), a static comparison (c1) between the signs of the instantaneous values respective of the first and second signal Signal1, Signal2.

Such a method, which in particular corresponds to the example described above, advantageously allows using directly and rapidly "raw" signals, as they are provided by the other on-board systems (ABS, ESP . . . ), by analyzing said signals to extract their respective signs then by comparing said signs.

According to another implementation ("dynamic method" in FIG. 1), which may be applied independently or conversely in complement to the previous static mode, it may be achieved, during the comparison step (c), a dynamic comparison (c2) between the signs of the respective variations of the first and the second signal.

According to this second implementation, it may in particular be examined, for the considered signal or signals, the sign of the evolution of the values of one same signal over a predefined period, for example by measuring the difference between two values of said signal collected respectively during two successive iterations of the algorithm performing the method.

Obviously, it may be considered any suitable processing of the signal for reporting and/or quantifying a signal variation, such as for example a computation of the derivative of said signal or signals, or the application to said signals of a high-pass filter.

As what has been considered for comparing the "raw" values of the signals, it is possible to define a comparison law which provides that if the sign of the variation (for example positive for an increase, negative for a decrease) of the first signal is identical to the sign of the variation of the second signal, then this means that the vehicle is running forward, whereas if the sign of the variation of the first signal is different from that of the variation of the second signal, this means that the vehicle is running backwards.

Advantageously, it is considered to accumulate the two implementations, in order to achieve, if need be in parallel, at the same time a static comparison (c1) and a dynamic comparison (c2) based on the same signals, then, if need be, compare the results from each of these methods, and thus to improve the reliability and precision of the method.

Particularly, it may be decided that, if the two implementations provide identical results, that is to say both conclude to the same direction of travel, then the new result is considered to be reliable, and that if they on the contrary provide divergent results, one of said implementations concluding to a forward running and the other a reverse running, then the result of the current iteration must be dismissed, and the result of the last consistent iteration preceding said current iteration must be kept, said result of the last coherent iteration thus being "extended", temporarily, at least until the following iteration.

Whatever the implementation considered, the method according to the invention preferably comprises a step (d) of filtering the first and/or the second signal during which the first signal Signal1, respectively the second signal Signal2 is compared with a predetermined acceptance threshold, then a step (e) of analyzing and of conditional neutralization during which it is selected, for applying step (c) of comparing the current iteration $\underline{n}$, either the sign of the signal which is newly collected during said iteration sign[Signal1](n), if said Signal1 is deemed reliable as higher than or equal to the acceptance threshold, or on the contrary the sign of the signal which was collected during the previous iteration sign[Signal1](n−1), if said signal is deemed dubious as lower than said acceptance threshold.

Advantageously, such a filtering in particular allows eliminating the imperceptible signals, drowned in the background noise, and thus prevents insufficiently reliable data to be used, which would risk distorting the computation and lead to an erroneous conclusion with regard to the direction of travel.

Such a precaution is in particular appreciable in the hypothesis where the vehicle would run strictly in a straight line (situation 2C in FIG. 2), in such a manner that the signals would be quasi-zero, and their possible amplitudes, for example resulting from slight trajectory corrections oscillating around the neutral position, would not correspond to clear maneuvers and thereby would not be sufficient to be really significant.

In such a case of indetermination, for lack of relevant new data which would enable fine-tuning or updating the appraisal of the operating conditions of the vehicle, the algorithm hence advantageously excludes from the computation the dubious signals and carries forward, by way of precaution and temporarily, the result (sign of the considered signal) from the previous iteration, that is to say carries forward the result of the last estimation achieved in satisfactory reliability conditions.

Naturally, as soon as this transition phase has passed, that is to say as soon as a sufficiently significant change has come up of the driving conditions, for example during a change of driving lane or the engaging of the vehicle in a curve, said change in conditions is immediately signaled by the clear shifting of the signal or signals to positive or negative, beyond the value of the acceptance threshold, thus allowing to resume and update, substantially in real time, the detection of the direction of travel.

The acceptance threshold or thresholds, which define "deadbands" for excluding signals which are judged to be insufficiently reliable, may advantageously be adjustable.

The method may thus comprise, prior to the comparison step (c), a step of adjusting the threshold (not shown) during which is set, and for example it is selected and/or automatically modified, if need be, said acceptance threshold or thresholds, for example depending on the value of one and/or the other of the concerned signals.

Such an adjustment advantageously allows regulating the sensitivity of the method, by seeking a compromise between performance and robustness. Generally, the chosen threshold must be at least higher than the predictable level of noise of the concerned signal, which could be for example measured by test campaigns.

Furthermore, according to a preferential feature which may constitute an invention in its own right, the method comprises a verification step (f) during which the measured or estimated linear speed V of the vehicle is compared with a predetermined speed threshold $V_{threshold}$, so as to allow the validation of a change in direction of travel, diagnosed during the step (c) of comparison, only on condition that the linear speed of the vehicle is lower than said speed threshold.

Indeed, the change in direction of travel physically supposes that the vehicle linear speed crosses zero, which inevitably involves that the absolute value of said measured speed decreases below a threshold close to zero, during the time range comprised between the two successive iterations surrounding the instant where this zero crossing occurs, wherein said threshold may be further set according on the one hand to the algorithm sampling frequency and on the other hand to the maximum predictable magnitudes of acceleration or deceleration of the vehicle.

A contrario, as long as the linear speed of the vehicle remains permanently higher than said threshold, it is impossible that a change in the direction of travel may have occurred, and any contrary conclusion, which is inevitably erroneous, must hence be dismissed.

Advantageously, such a verification step (f) hence provides an additional monitoring criteria, by means of a third driving parameter, which allows confirming or on the contrary dismissing the interpretation of the operating conditions determined by the comparison step or steps (c), (c1), (c2), thus contributing to improving the reliability of the method.

Naturally, such a step may in particular be used alone, or in combination with the aforementioned filtering and analyzing steps, in order to obtain a reinforced reliability.

According to a preferential implementation of the invention, the method for determining the direction of travel forms an integral part, such as is illustrated on FIG. 3, of a method for determining the absolute angular position of a steering wheel, this last method being based on at least one model involving a dynamic driving parameter of the vehicle, such that the difference in speed between the wheels of one same axle system, the lateral acceleration of the vehicle, or the yaw rate, and wherein said method for determining the direction of travel contributes to the detection of at least one operating situation of the vehicle which is considered unfavorable for the reliability of said model used, such as a reverse running with marked turning situation.

Advantageously, in the case of detection of an operating situation which is detrimental to the precision or reliability of said method for determining the absolute angular position of the steering wheel, and particularly in the case of a detection of reverse running in certain predetermined specific conditions, located in the limit or outside the domain of validity of the used model, such as certain turning conditions, it may be provided emitting an inhibition signal for temporarily neutralizing or correcting the proceedings of the computation algorithm which computes said absolute angular position.

Preferably, the algorithm used for performing the method for determining the absolute angular position of the steering wheel is an "angle finding" type algorithm such as described for example in patent application FR-2 953 181, filed by the applicant.

According to this algorithm, it is first measured the relative angular position of said steering wheel, for example by means of a "resolver" type sensor placed on the shaft of the power assisted engine coupled to the steering column, then a corrective offset value (offset) is added to this relative measurement, in order to obtain the absolute instantaneous position, multi-rotation, of the steering wheel, wherein the corrective offset value (offset) is computed as being the weighted average of the successively noted differences, with each iteration, between on the one hand the value of the relative angular position measured during the considered iteration, and on the other hand an estimation of the absolute angular position of the steering wheel, indirectly obtained by applying laws based on the Jeantaud-Ackerman analysis and involving dynamic driving parameters, such as the speed difference between the rear wheels, provided by the anti-blocking system ABS, or even the lateral acceleration or the instantaneous yaw rate, provided by the stability control system ESP.

To these differences are attributed, for computing the finally retained offset, weighting coefficients which may be interpreted as a reliability index as to the precision of the estimation of the absolute angular position, depending on driving conditions and the origin of the parameter used for the computing.

More particularly, the method for determining the angular position of the steering wheel may comprise a step (not shown) of measuring the relative angular position during which a value representing the relative angular multi-rotation position $\theta_{relative\_wheel}$ of the steering wheel is measured, by using an on-board sensor, of resolver type, preferably initialized to zero during the starting of the vehicle.

In the case of using a sensor of resolver type associated with the shaft of the electric steering power assisted engine, the relative angular position of the steering wheel may be expressed in the form of:

$$\theta_{relative\_wheel} = \frac{\theta_{mono\_elec} + N_{rotations\_elec} \times 360}{\Gamma \times p}$$

where:
$\Theta_{mono\_elec}$ represents the absolute "electric angle", that is to say the measurement of absolute angular position of the shaft of the assistance engine in an "electric rotation", that is to say in a travel cycle ranging between two successive stator poles of said engine, and whose value as a rule ranges between 0 and 359 "electric" deg, bearing in mind that the relationship between the electric angle and the mechanical angle of the rotor $\Theta_{mono\_meca}$ is given by $\Theta_{mono\_elec} = p \times \Theta_{mono\_meca}$;

$N_{elec\_rotations}$ represents the number of "electric" rotations carried out by the shaft of the assistance engine, this variable being incremented by 1 (one unit) with each passage of $\Theta_{mono\_elec}$ of 359 deg to 0 deg, or decremented with each passage of $\Theta_{mono\_elec}$ of 0 deg to 359 deg;

p is the number of pairs of stator poles of the assistance engine;

$\Gamma$ is the ratio of reduction of the reducer coupling the assistance engine to the steering column.

This relative measurement will preferably be initialized at the starting of the vehicle, the number of rotations $N_{elec\_rotation}$ being set to zero. The value of mono-rotation electric position $\Theta_{mono\_elec}$ itself has an initial value which may range between 0 deg and 359 deg, and which reflects the orientation of the steering wheel at the moment of said starting.

Thus, upon starting (at the initializing), the initial measurement of relative angular multi-rotation position of the steering wheel $\theta_{relative\_wheel}$ will be worth:

$$\theta_{relative\_wheel}(0) = \frac{\theta_{mono\_elec}(0)}{\Gamma \times p}$$

Further, the value of the angular multi-rotation position could never be higher than the angular maximum travel of the steering wheel from stop to stop.

The method may also comprise a step (g) of first estimation of absolute position during which it is evaluated a first value Angle1 representing the absolute angular position of said steering wheel by means of a first model based on the analysis of at least one first dynamic driving parameter of the vehicle, such as the difference in speed between the wheels of a same axle system, as well as a step (h) of second estimation of absolute position during which it is evaluated a second value Angle2 representing the absolute angular position of said steering wheel by means of a second model, distinct from the first model and based on the analysis of at least one second dynamic driving parameter of the vehicle, such as yaw rate and/or lateral acceleration.

Said method may then comprise a step (not shown) of computing raw dynamic offset, during which it is computed a first value of dynamic offset $\Delta\theta_{dynamic(1)}$, respectively a second value of dynamic offset $\Delta\theta_{dynamic(2)}$, corresponding to the difference between the first value Angle1 representing the absolute angular position, respectively the second value Angle2 representing the absolute angular position, and the value representing the relative position $\theta_{relative\_wheel}$ measured for the current iteration $\underline{n}$, then a weighting step (i) during which it is assigned to each dynamic offset value a proper weighting coefficient $weight_i(n)$ then a learning step where a final offset value $\Delta\theta_{final}(n)$ is computed for the current iteration $\underline{n}$, which corresponds to the weighted average of the final offset value computed during the previous iteration $\Delta\theta_{final}(n-1)$ and assigned with score $sc(n-1)$ corresponding to the integral sum of the weighted coefficients used successively on the set of the previous iterations on the one hand, and the first and second dynamic offset values newly computed for the current iteration $\Delta\theta_{dynamic(i)}(n)$ and assigned with their respective weighted coefficient $weight_i(n)$ on the other hand:

$$\Delta\theta_{final}(n) = \frac{\Delta\theta_{final}(n-1) \times sc(n-1) + \sum_{i=1}^{2} \Delta\theta_{dynamic(i)} \times weight_i(n)}{sc(n-1) + \sum_{i=1}^{2} weight_i(n)}$$

The absolute multi-rotation position of the steering wheel is hence expressed:

$$\theta_{absolute\ multi-rotation\ wheel}(n) = \theta_{relative\_wheel}(n) + \Delta\theta_{final}(n)$$

In a particularly advantageous manner, such a method may also comprise, according to a feature which may constitute an invention in its own right, a coherence verification step (j) during which it is computed the difference between the first value Angle1 and the second value Angle2 obtained by the aforementioned models and this difference is compared to a predetermined coherence threshold $\underline{S}$, which may be if need be adjusted on a case-by-case basis according to the lowest of said first and second values.

Thus, if the difference |Angle1−Angle2| between said first and second angle values is lower than said threshold $\underline{S}$, said values are deemed consistent, and their weighting (non zero weighting) kept in such a manner that said values actually contribute to the learning of the final offset value.

A contrario, if the difference between said values exceeds said threshold, said values are deemed dubious as they result from applying at least at least one of the models in conditions located in the limit or even outside the domain of acceptable precision or validity of said model, and said values are hence dismissed from the learning computation by a forced cancellation of their respective weighting coefficients for the concerned iteration ($weight_i(n)=0$). Thus, the terms corresponding to values deemed unreliable are cancelled and without consequence on the learning.

Thus, the reliability and precision of said learning may be significantly improved, and thereby essentially of the method for determining the absolute angular multi-rotation position of the steering wheel.

In practice, the weighting step (i) may hence integrate one or several phases of verification of the validity of the applied models, and in particular decompose into several successive sub-steps, here into at least three sub-steps, corresponding to:

- a first level of weighting ("initial weighting") from abacuses and in particular depending on the origin of the dynamic parameter used for computing the value of the absolute angular position, as well as the driving conditions, such as is described in the aforementioned application FR-2 953 181;
- a second level of weighting ("intermediate weighting") resulting from the step of verifying the coherence between the first and second values representing the absolute angular position of the steering wheel, which are computed based on dynamic parameters by the models, this second weighting level corresponding either to the initial weighting if said values are consistent, or to zero weighting coefficients in the opposite case; and
- a third level of weighting ("final weighting", which will be the weighting that is actually applied to the computing of the weighted average), which involves the detection of the direction of travel, and which keeps the intermediate weighting (whatever it is) in the absence of the inhibition signal, or on the contrary forces said weighting to zero if an inhibition signal is activated following the detection of particular conditions of reverse running deemed unfavorable, for example in marked turning.

The neutralizing of the dubious values by cancellation of the corresponding weighted coefficients may thus result either from a default of consistence of the computed angle values, or from the detection of an unfavorable operating condition (here reverse running in marked turning), that is to say that it can be decided, according to a more global Boolean vision, if one or the other of the conditions of non applicability of a model is fulfilled.

Naturally, the invention is in no way limited to a particular alternative embodiment, the skilled person having in particular the possibility of isolating or combining the different features described above.

Particularly, the skilled person could adapt the order of the different aforementioned steps, or even involve more than two signals and/or more than two parameters for determining the running direction, provided that said signals form in their whole a deterministic system, and set enough conditions for defining without any ambiguity the direction of travel.

Furthermore, the present invention of course also relates to a motor vehicle, and in particular a land motor vehicle intended for the individual or collective transport of persons or merchandise, which has an on-board computer, of the electronic module type, arranged or programmed to implement a method such as that described above.

The invention finally relates to a software program containing elements of software program code allowing the implementation of a method in accordance with the invention when said program is executed on a computer, as well as a data medium readable by a computer, of the disk, flash memory, USB key type, etc. containing elements of software program code allowing the implementation of such a method when said medium is read by a computer.

The invention claimed is:

1. A method for determining the longitudinal direction of travel of a vehicle, said method comprising:
    a step (a) of collecting a first signal (Signal1) from a torque sensor, representing a first driving parameter, wherein the sign of the variations of said first signal does not depend on the longitudinal direction of travel of the vehicle, and the first parameter is a torque exerted by a driver of the vehicle on a steering wheel of the vehicle,
    a step (b) of collecting a second signal (Signal2) from a stability control system sensor, representing a second driving parameter distinct from the first driving parameter, and wherein the sign of the variations of said second signal changes depending on the longitudinal direction of travel of the vehicle, wherein the second parameter is a yaw rate ($\psi'$) of the vehicle, then
    a step (c) of comparing signs, said step (c) comprising:
        a static comparison (c1) between the signs of respective instantaneous values of the first and second signal (Signal1), (Signal2), wherein the sign of the instantaneous value of the first signal (Signal1) is compared with the sign of the instantaneous value of the second signal (Signal2) in order to determine therefrom the longitudinal direction of travel of the vehicle, depending on whether said signs are identical or on the contrary different from each other, and
        a dynamic comparison (c2) wherein the sign of the variation of the first signal (Signal1) over a predefined time period is compared with the sign of the variation of the second signal (Signal2) over the predefined time period in order to determine therefrom the longitudinal direction of travel of the vehicle, depending on whether said signs are identical or on the contrary different from each other,
    a step of determining a confirmed longitudinal direction of travel based on the longitudinal direction of travel determined by the static comparison (c1) and the longitudinal direction of travel determined by the dynamic comparison (c2), and
    a step of using, by an onboard computer in the vehicle, the determined confirmed longitudinal direction of travel of the vehicle to inhibit determination of an absolute angular position of a steering wheel of the vehicle.

2. The method according to claim 1, further comprising a step (d) of filtering at least one of the first signal and the second signal during which the first signal (Signal1), respectively the second signal, is compared with a predetermined acceptance threshold, then a step (e) of conditional neutralizing, comprising selecting, for applying the comparison step (c) during a current iteration (n), either the sign of the signal which is newly collected during said iteration (sign[Signal1](n)), if said signal (Signal1) is deemed reliable as higher than or equal to the acceptance threshold, or on the contrary the sign of the signal which was collected during the previous iteration (sign[Signal1](n−1)), if said signal is deemed dubious as lower than said acceptance threshold.

3. The method according to claim 1, further comprising a verification step (f) during which the measured or estimated linear speed (V) of the vehicle is compared with a predetermined speed threshold (Vthreshold), so as to allow validating a change in the direction of travel, diagnosed during the comparison step (c), only on condition that the linear speed of the vehicle is lower than said speed threshold.

4. The method according to claim 1, wherein it forms an integral part of a method for determining the absolute angular position of the steering wheel being based on at least one model involving a dynamic driving parameter of the vehicle, and wherein said method for determining the direction of travel contributes to the detection of at least one operating situation of the vehicle, which is considered unfavorable for the reliability of said model used.

5. A motor vehicle, comprising an on-board computer arranged or programmed to implement a method according to claim 1.

6. A data medium readable by a computer and containing elements of software program code allowing the implementation of a method according to claim 1 when said medium is read by a computer.

7. The method according to claim 1, wherein the torque sensor is placed on the steering column.

8. The method according to claim 1, wherein the step of determining a confirmed longitudinal direction of travel comprises comparing the result from the static comparison (c1) with the result from the dynamic comparison (c2) and, if the results are identical, then considering that said results provide a reliable direction of travel, or, if the results are divergent, then dismissing said results.

9. The method according to claim 4, wherein the dynamic driving parameter of the vehicle is chosen from among: the difference in speed between the wheels of a same axle system, the lateral acceleration of the vehicle, or the yaw rate.

10. The method according to claim 4, wherein said method for determining the direction of travel contributes to the detection of a situation of a reverse running in which a turning angle exceeds a predetermined threshold.

11. The method according to claim 7, wherein said method for determining the direction of travel contributes to the detection of a situation of a reverse running in which a turning angle exceeds a predetermined threshold.

12. The method according to claim 1, further comprising a step (d) of filtering at least one of the first signal and the second signal during which the first signal (Signal1), respectively the second signal, is compared with a predetermined acceptance threshold, then a step (e) of conditional neutralizing, comprising selecting, for applying the comparison step (c) during a current iteration (n), either the sign of the signal which is newly collected during said iteration (sign[Signal1](n)), if said signal (Signal1) is deemed reliable as higher than or equal to the acceptance threshold, or on the contrary the sign of the signal which was collected during the previous iteration (sign[Signal1](n−1)), if said signal is deemed dubious as lower than said acceptance threshold.

* * * * *